United States Patent
Quintero

(10) Patent No.: US 12,377,816 B1
(45) Date of Patent: Aug. 5, 2025

(54) SYSTEM FOR REMOVING WATER FROM WINDSHIELDS

(71) Applicant: Leonardo Luis Quintero, Newark, NJ (US)

(72) Inventor: Leonardo Luis Quintero, Newark, NJ (US)

( * ) Notice: Subject to any disclaimer, the term of this patent is extended or adjusted under 35 U.S.C. 154(b) by 0 days.

(21) Appl. No.: 18/585,855

(22) Filed: Feb. 23, 2024

(51) Int. Cl.
 *B60S 1/38* (2006.01)
 *A47L 7/00* (2006.01)
 *B60S 1/04* (2006.01)
 *B60S 1/54* (2006.01)

(52) U.S. Cl.
 CPC .......... *B60S 1/546* (2013.01); *A47L 7/0076* (2013.01); *B60S 1/0491* (2013.01); *B60S 1/3803* (2013.01); *B60S 1/38* (2013.01)

(58) Field of Classification Search
 CPC .......... B60S 1/3803; B60S 1/546; B60S 1/08; B60S 1/34
 See application file for complete search history.

(56) References Cited

U.S. PATENT DOCUMENTS

| 6,008,474 | A | * | 12/1999 | Dumas | B60S 1/3803 15/250.07 |
|---|---|---|---|---|---|
| 2020/0017075 | A1 | * | 1/2020 | Srinivas | F16H 19/001 |
| 2020/0127526 | A1 | * | 4/2020 | Shiga | H02K 5/225 |
| 2020/0290568 | A1 | * | 9/2020 | Roth | B60R 1/006 |

* cited by examiner

*Primary Examiner* — Michael D Jennings

(74) *Attorney, Agent, or Firm* — Joshua Kaplan, Esq; Kaplan Law Practice LLC

(57) ABSTRACT

Disclosed is a wiper device that is comprised of a system of hoses that connect to windshield wipers on one end and to a vacuum tank on the other end. The motor inside the vacuum tank is configured to suction both air and water through the system of hoses. A plurality of openings on the sidewall of the windshield wipers is able to channel air and water through the cavity of the body of the windshield wipers to the system of hoses.

12 Claims, 4 Drawing Sheets

SYSTEM FOR REMOVING WATER FROM WINDSHIELDS

BACKGROUND OF THE INVENTION

Moisture buildup on windshields of a vehicle is a very substantial hazard and is a contributing cause in many crashes. While the basic protection against water buildup, windshield wipers, are an adequate solution while a vehicle is stationary or traveling at lower speed, a vehicle traveling at highway speeds in a heavy rain, usually experiences a severe degradation in visibility a wipers become overwhelmed, especially in heavy downpours.

Water wicking technology has been around for almost as long as the automobile itself, and outside of the introduction of multi-surface wipers designed to capture additional water amount with every stroke, the time proven approach of wicking water remains the same. At the same time, while the existing method of shuttling water using wipers clearly works most of the time, it is desirable to have a succor to this time tested technology in circumstances when the wipers are overwhelmed, or have a reduced effectiveness due to age or wear.

Therefore, it is highly desirable to develop a solution that results in greatly enhancing effectiveness of windshield wipers.

SUMMARY OF THE INVENTION

At least one specification heading is required. Please delete this heading section if it is not applicable to your application. For more information regarding the headings of the specification, please see MPEP 608.01(a).

Disclosed is a windshield wiper enhancement apparatus having an air vacuum. The disclosed air vacuum is configured to be mounted inside an external compartment of a vehicle. The eternal compartment may be the engine bay, a luggage compartment or a utility bin. The disclosed vacuum is further made up of a tank, housing a vacuum motor and an ejection valve. A first end of a flexible hose connects to the wall of the air vacuum tank, with the second end of the flexible hose connecting to a splitter. The second end of the splitter then supports the proximal end of at least one wiper hose. The distal end of the wiper hose then forming a first portion of a coupler. The second portion of the coupler is windshield wiper housing or body.

The windshield wiper that enables the enhancement apparatus is comprised of a housing or body. The body has two sidewalls and a top wall. The two sidewalls and the top wall define an internal cavity. The body further comprises a plurality of openings placed along one or both of the two sidewalls, with each of the plurality of openings in communication with and opening into the internal cavity.; a second portion of said coupler extending from said body; said second portion of said coupler being in an air communication with said internal cavity; and wherein said second portion of said coupler removably coupling with a first portion of said coupler.

In one embodiment, the wiper enhancement apparatus is assisted by heating elements placed in location of high air flow or expected liquid passage. Therefore, heating elements may be placed in the body, within the splitter, on the housing of the wipers, within or around the ejection valve.

DETAILED DESCRIPTION OF THE INVENTION

Figure 1:
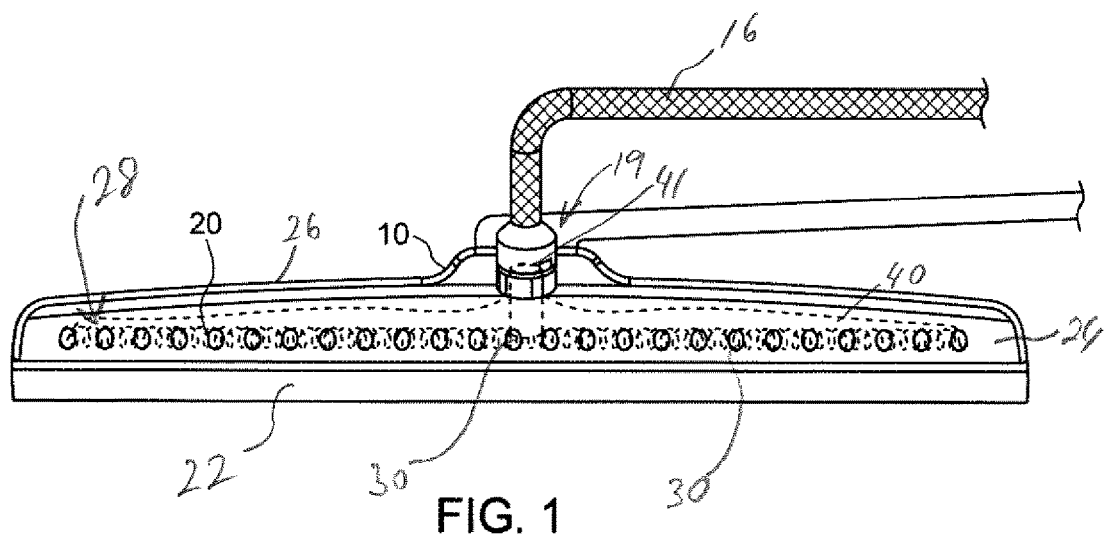
FIG. 1 and FIG. 2 are close up diagrams of windshield wipers having an opening and connecting to wiper hoses through the first and second portions of coupler.

At least one specification heading is required. Please delete this heading section if it is not applicable to your application. For more information regarding the headings of the specification, please see MPEP 608.01(a).

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
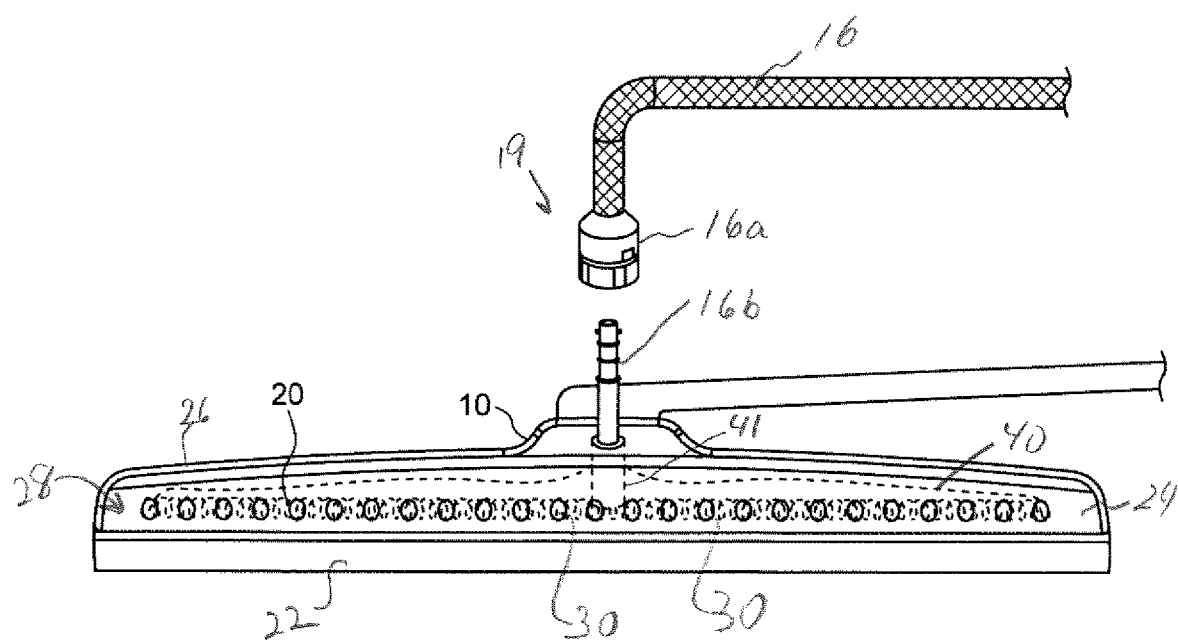

FIGS. 1 and 2 demonstrate a windshield wiper 10, which is part of the wiper device 10. The windshield wiper 10 connects to an air vacuum (90). Each wiper device 10 is coupled with least one wiper hose 16. The proximal end (18) the wiper hose 16 connects to the splitter (120) and a distal end 19 of the wiper hose 16 is preferably further split into a first portion of a coupler 16a and a second portion of a coupler 16b. The first portion of the coupler 16a couples with the second portion 16b on the windshield wiper 10. The windshield wiper 10 is shown having a body 20 and a wiping edge 22. The body 20 is comprised of sidewall 24 and a top wall 26. The bottom wall is formed by the wiping blade or wiping edge 22. The sidewall 24, the top wall 26 and the wiping edge 22 define an internal cavity 28. Also shown are a plurality of openings 30 along at least one side of the sidewall 24. Each of the plurality of openings 30 opening into the internal cavity 28. The second portion of the coupler 16b is shown as the male portion extending from the body 20 toward the first portion 16a. The coupler 16a-16b shown is a sleeve coupler, where the first portion 16a represents a sleeve that is snapped over or which clamps over the second portion 16b. Other couplers may be a hook and loop, snap components, a bayonet coupler, or any other type of coupler. The coupler 16a/b is configured to bring the wiper hose 16 in an air communication with said internal cavity 28.

The windshield wiper 10 mounts to the body of the vehicle using the wiper arm 12, with the wiper hose 16 running in parallel to and preferably, along the wiper arm 12. The wiper hose 16 would be made preferably from flexible material, such as plastic or rubber. Shown also is a heating element 40 running along the body 20. The heating element 40 is shown running along the same axis as the plurality of openings 30 and is intended to melt any ice accumulating along the wiping edge 22 and ice accumulating along the opening 30. Additional heating element 41 may exist by the second coupling portion 16b.

Figure 3:
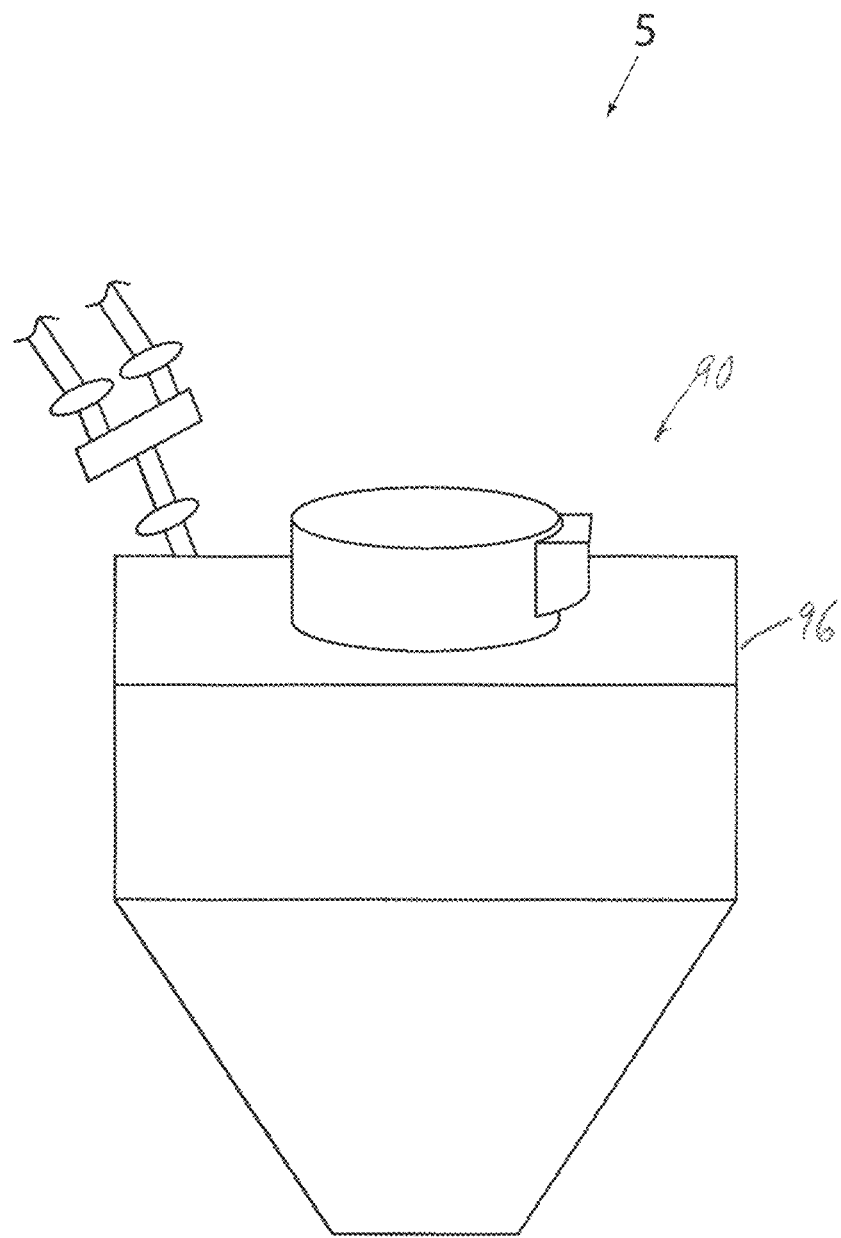
FIG. 3 is an external diagram of the tank.
Figure 4:
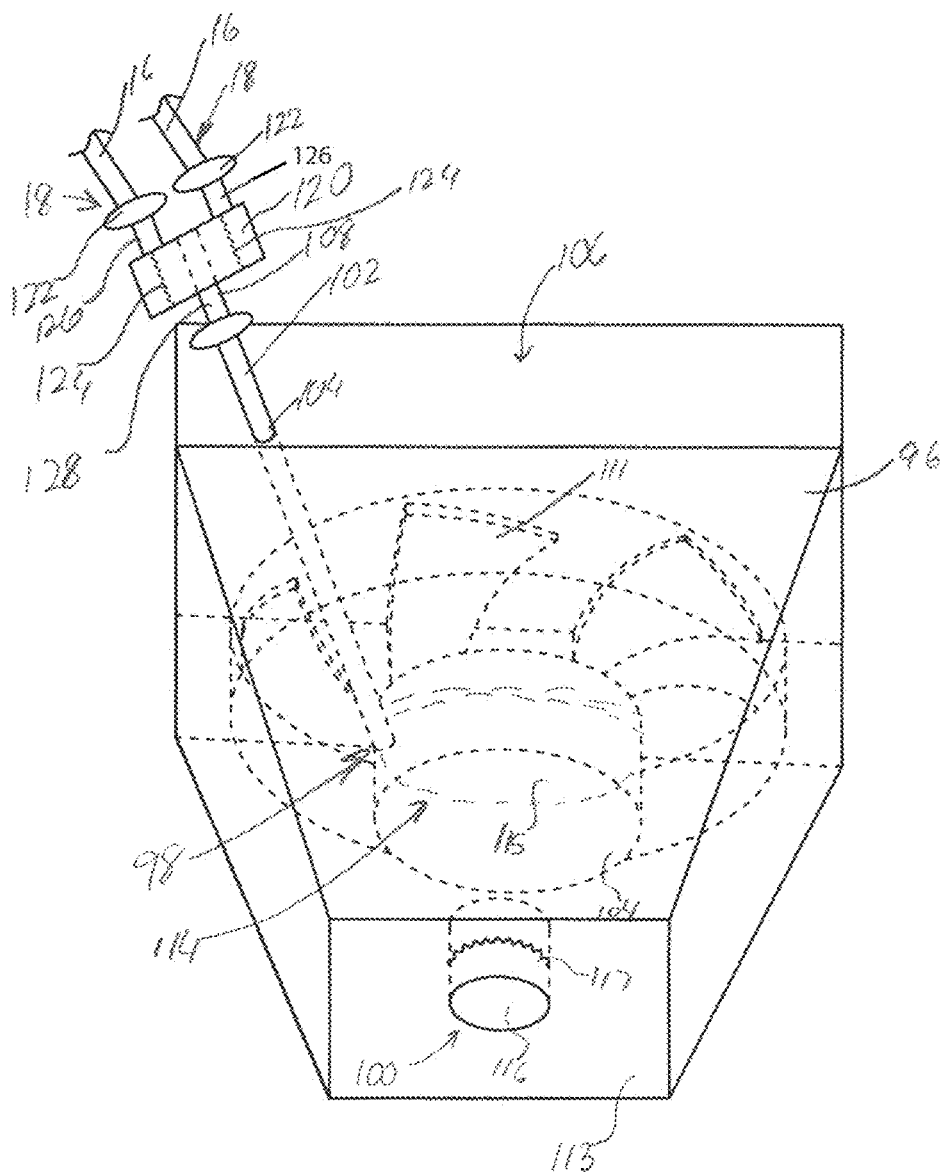
FIG. 4 is a transparent diagram of the tank.
Figure 5:
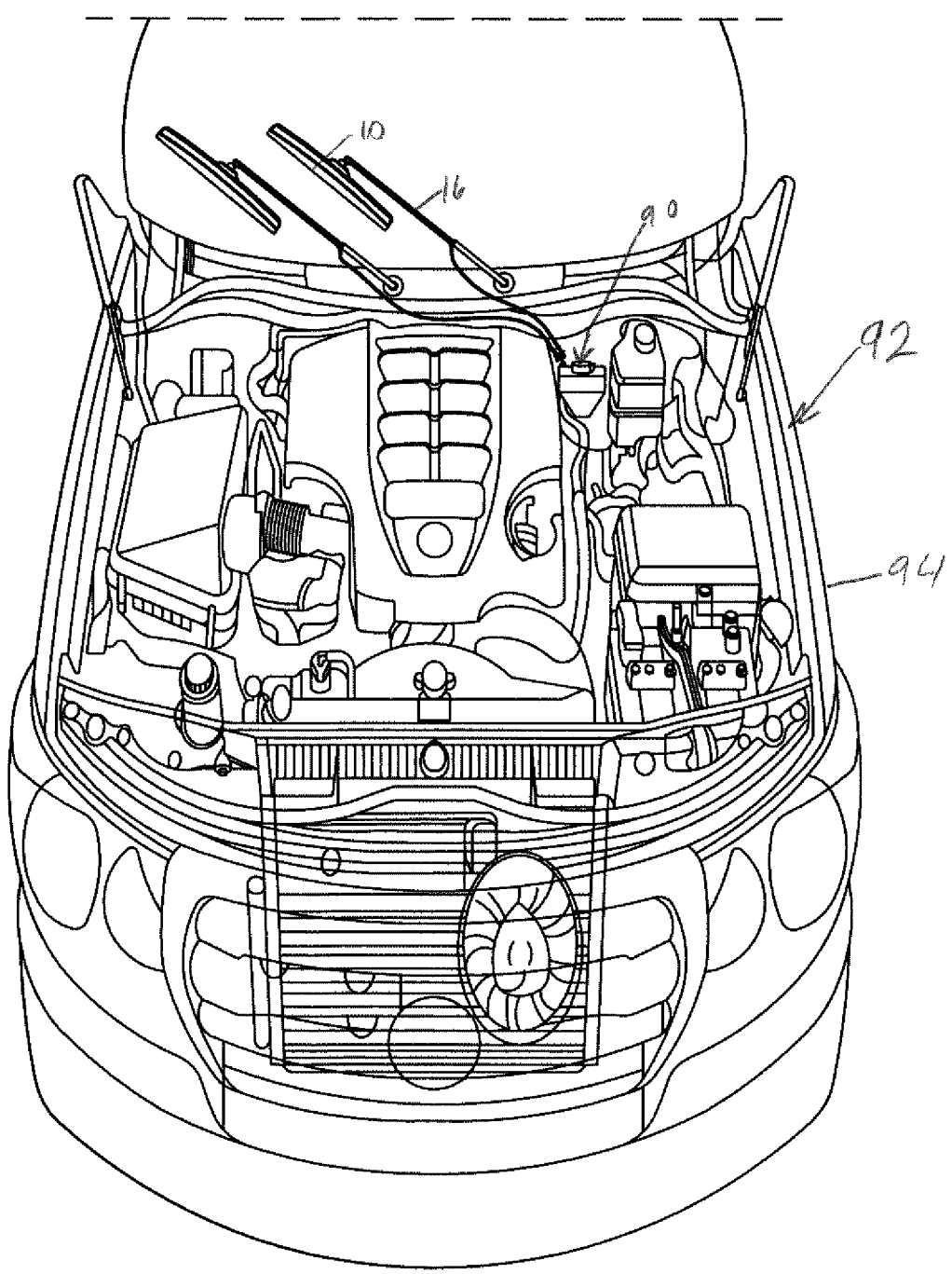
FIG. 5 demonstrates the installation of the tank within the compartment of a vehicle.

FIGS. 3-5 demonstrate the wiper device 5, having a vacuum 90. The vacuum 90 is preferably an air or water vacuum and is configured to be mounted inside an external compartment 92 of a vehicle 94. The vacuum 90 is further comprised of the tank 96. Stored inside the tank 96 is the motor 98 and an ejection valve 100. The flexible hose 102 having the first end 104 connecting to 106 wall of the vacuum 90, and a second 108 end of the flexible hose 102 connecting to a splitter 120. The proximal end 18 of each wiper hose 16 connects to the splitter 120, with the distal end 19 of each wiper hose 16 connecting to the windshield wiper 10.

The splitter 120 is configured to contain a valve 122, which would control the flow of air or water between the wiper hose 16 and the tank 96. The valve 122 would preferably be able to detect any presence of ice inside the hose 16 or in the air/water flow within the hose 16, and if so detected to activate the heating element 124 that preferably surrounds the nozzles 126 that are coupled with the proximal end 18, or the lower nozzle 128 that holds the flexible hose 102.

The tank 96 is comprised of a motor 98 that provides suction to the flexible hose 102 and the wiper hoses 16. The suction is supplied by fan 111 that is powered by the motor 98. The air and water is directed into the tank 96 through the flexible hose 102 which is channeled through the floater device 114, with the air being expelled through the exhaust port 112. The water and debris settle at the bottom wall 113 of the tank 96. The floater device 114 controls the amount of liquid settling inside the tank 96. As water accumulates the floater 115 rises until the point that it triggers a solenoid, which in turn opens the ejection port 116 of the ejection valve 102. Preferably the ejection valve 102 is able to detect ice buildup around the ejection port 116 to activate the heating element 117. Additionally, any one or all of the heating elements 40, 41, 124, and 117 can be connected to a switch that can be activated independently by the vehicle's circuitry or by a user. The sidewalls 106 are preferably tapered or conical toward the bottom wall 113 and may form or an elliptical cone, or a diametric shape, such as an inverted pyramid or a pyramid of having between 5 and 10 walls 106. The conical walls are preferred to ease mounting of the tank 96 within the exterior compartment 92. Additionally, the conical walls cause solid debris to be suctioned through the openings 30 and settling at the bottom wall 113 to be expelled through the ejection port 116. It is preferred that the sidewall 106 may be split into a lid portion 106a and a sidewall portion 106b. So that the tank 96 can be intermittently cleared of debris, or for maintenance.

Although this invention has been described with a certain degree of particularity, it is to be understood that the present disclosure has been made only by way of illustration and that numerous changes in the details of construction and arrangement of parts may be resorted to without departing from the spirit and the scope of the invention. While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions--such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims, as currently written or as amended or added in the future. Descriptions of exemplary methods or processes are not limited to inclusion of all steps as being required in all cases, nor is the order that the steps are presented to be construed as required or necessary unless expressly so stated.

The invention claimed is:

1. A wiper device comprising; an air vacuum, said air vacuum configured to be mounted inside an external compartment of a vehicle; said air vacuum having a tank; said tank comprising a motor and an ejection valve; a flexible hose, wherein a first end of said flexible hose connecting to a wall of said air vacuum, a second end of said flexible hose connecting to a splitter; at least one wiper hose; wherein a proximal end of said at least one wiper hose connecting to the splitter and a distal end of each of said at least one wiper hose having a first portion of a coupler; said first portion of said coupler coupling with a windshield wiper; said windshield wiper having a body and a wiping edge; wherein said body having two sidewalls and a top wall; said two sidewalls and said top wall defining an internal cavity; a plurality of opening along at least one of said two sidewalls opening into said internal cavity; a second portion of said coupler extending from said body; said second portion of said coupler being in an air communication with said internal cavity; and wherein said second portion of said coupler removably coupling with a said first portion of said coupler.

2. The wiper device of claim 1, wherein said body further comprises heating elements.

3. The wiper device of claim 2, wherein said splitter further comprises a valve, said valve configured to control air flow between said at least one wiper hose and said flexible hose.

4. The wiper device of claim 3, wherein said splitter further comprises a heating element, said heating element configured to keep air passages within said splitter free of ice.

5. The wiper device of claim 1, wherein said splitter further comprises a heating element, said heating element configured to keep air passages within said splitter free of ice.

6. The wiper device of claim 1, wherein said ejection valve is configured to eject liquid from said tank after a quantity of said liquid has accumulated to a certain level.

7. The wiper device of claim 6, wherein said ejection valve further comprises a heating element.

8. The wiper device of claim 1, wherein said ejection valve further comprises a heating element.

9. The wiper device of claim 1, wherein said air vacuum is configured to be mounted inside an engine bay of a vehicle.

10. The wiper device of claim 1, wherein said air vacuum is configured to be mounted inside a luggage space of a vehicle.

11. The wiper device of claim 1, wherein said tank is substantially conical.

12. The wiper device of claim 11, wherein said splitter or said ejection valve further comprising heating elements.

* * * * *